United States Patent [19]

Swift et al.

[11] 4,138,326

[45] Feb. 6, 1979

[54] HYDROTREATING PROCESS AND CATALYST

[75] Inventors: Harold E. Swift, Gibsonia; Roger F. Vogel, Butler, both of Pa.

[73] Assignee: Gulf Research & Development, Pittsburgh, Pa.

[21] Appl. No.: 827,102

[22] Filed: Aug. 23, 1977

Related U.S. Application Data

[63] Continuation-in-part of Ser. No. 623,374, Aug. 12, 1977, abandoned.

[51] Int. Cl.$^2$ .................. C10G 23/00; C10G 17/00; B01J 29/06; B01J 23/16
[52] U.S. Cl. .................... 208/108; 208/143; 208/216 R; 208/254 H; 252/455 Z; 252/458; 252/467
[58] Field of Search ............. 208/143, 145, 216, 260, 208/255, 254, 304, 305, 89, 108; 252/455 R, 455 Z, 458, 459, 460, 467, 465

[56] References Cited

U.S. PATENT DOCUMENTS

| | | | |
|---|---|---|---|
| 3,340,179 | 9/1977 | Sathberlet | 208/254 H |
| 3,437,589 | 4/1969 | Goldthwait et al. | 208/254 H |
| 3,510,422 | 5/1970 | Cole et al. | 252/459 |
| 3,558,525 | 1/1971 | Noble | 252/458 |
| 3,730,878 | 5/1973 | Pollitzer | 208/143 |
| 3,781,195 | 12/1975 | Davis et al. | 208/143 |
| 3,844,978 | 10/1974 | Hickson | 252/455 Z |
| 3,844,979 | 10/1974 | Hickson | 252/455 Z |
| 3,852,405 | 12/1974 | Grandquist | 208/120 |
| 3,887,454 | 6/1975 | Hickson | 208/216 |
| 3,892,655 | 10/1975 | Hickson | 208/216 |
| 3,929,622 | 12/1975 | Grandquist | 252/455 Z |
| 4,022,684 | 5/1977 | Black et al. | 208/216 |

Primary Examiner—O. R. Vertiz
Assistant Examiner—Gary P. Straub

[57] ABSTRACT

A catalyst comprising (1) a subgroup of a certain class of nickel and/or cobalt-substituted semicrystalline aluminosilicates which are synthetic and which are predominantly ordered in two directions (laminar clay-like materials); (2) tungsten in the form of its oxide and/or sulfide; and (3) a crystalline zeolite which has an alpha value of at least 20, which is in particulate form, and which is dispersed through the layered aluminosilicate; and processes using this catalyst.

43 Claims, 6 Drawing Figures

COMPOSITE OF CURVES FOR FIGS. 1-5 FOR SELECTIVITY OF ZEOLITIC CATALYSTS HAVING VARIOUS MATRICES.

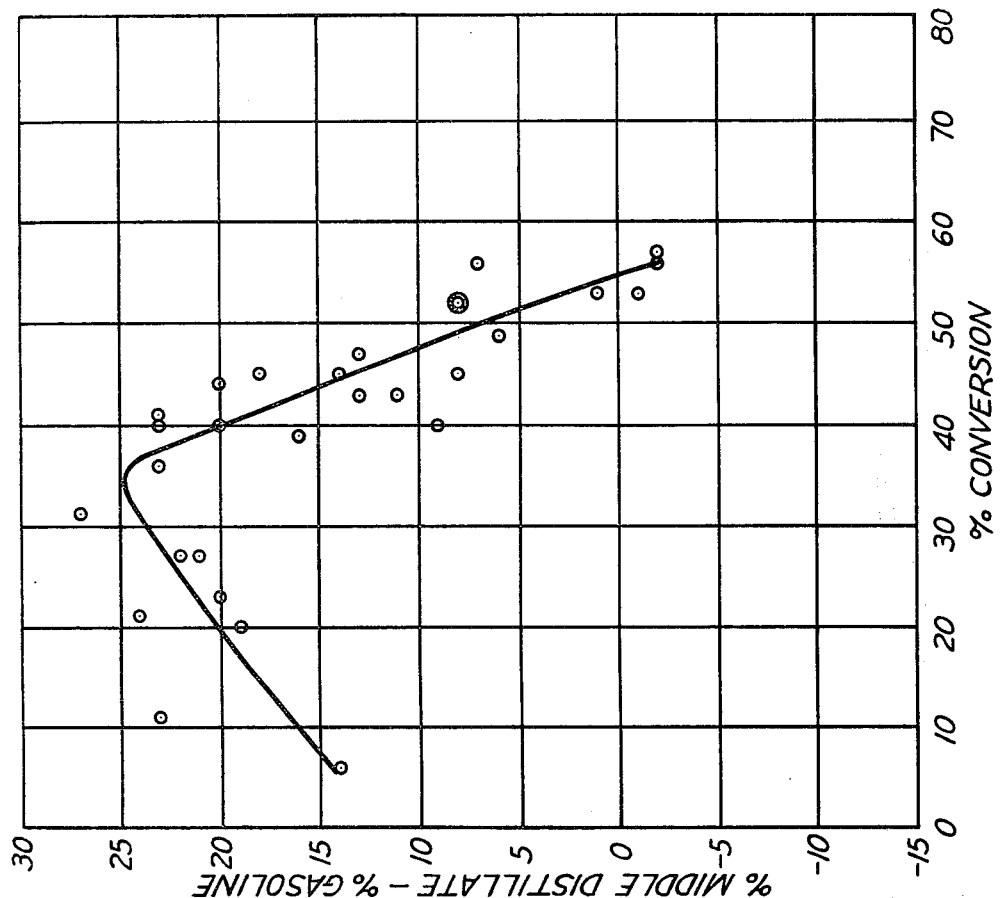
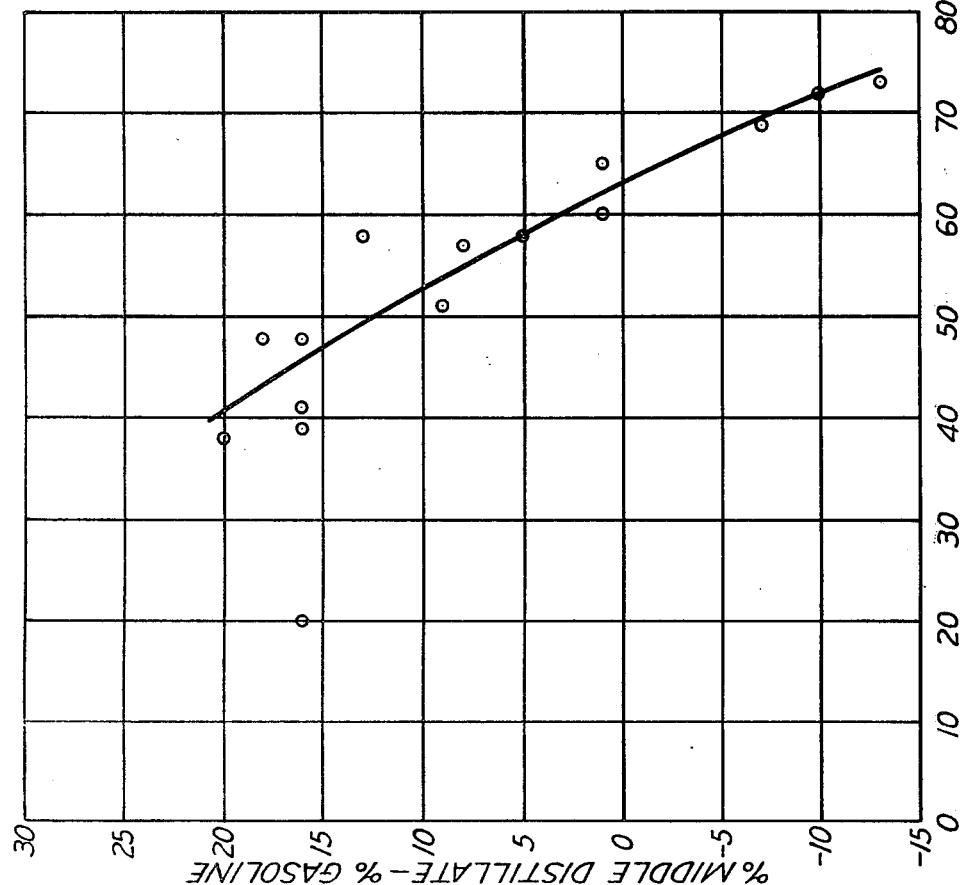

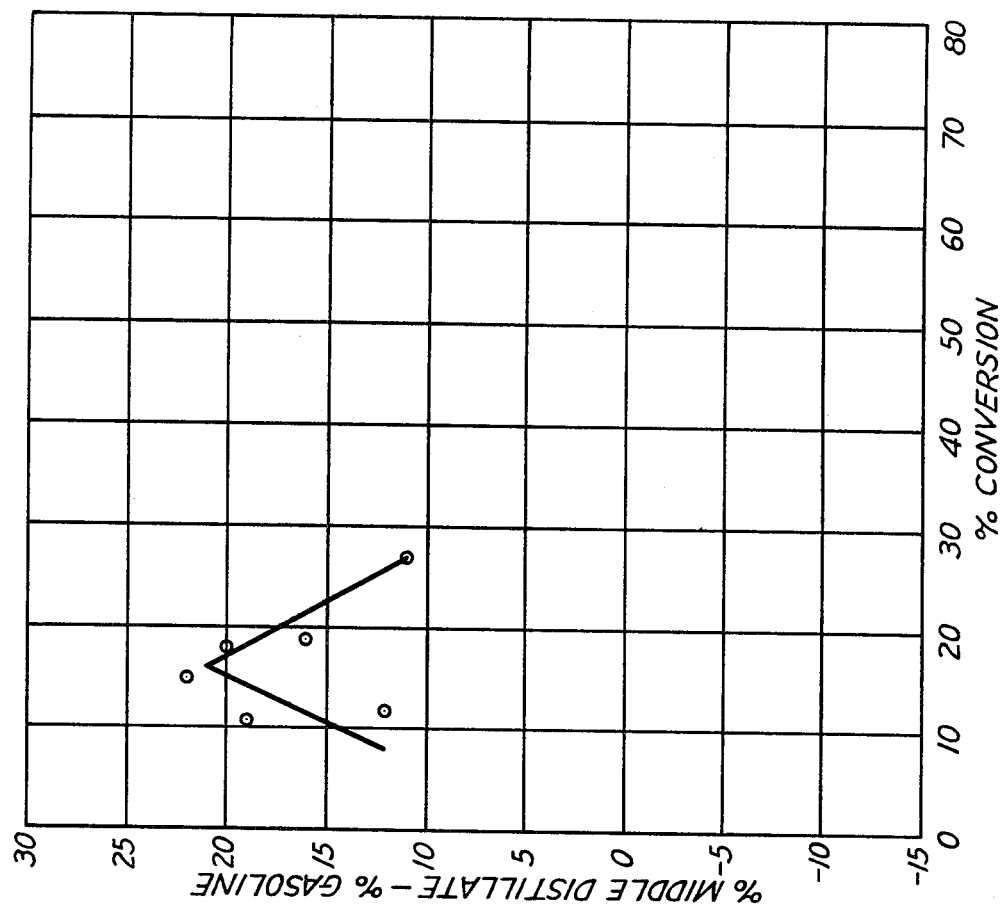
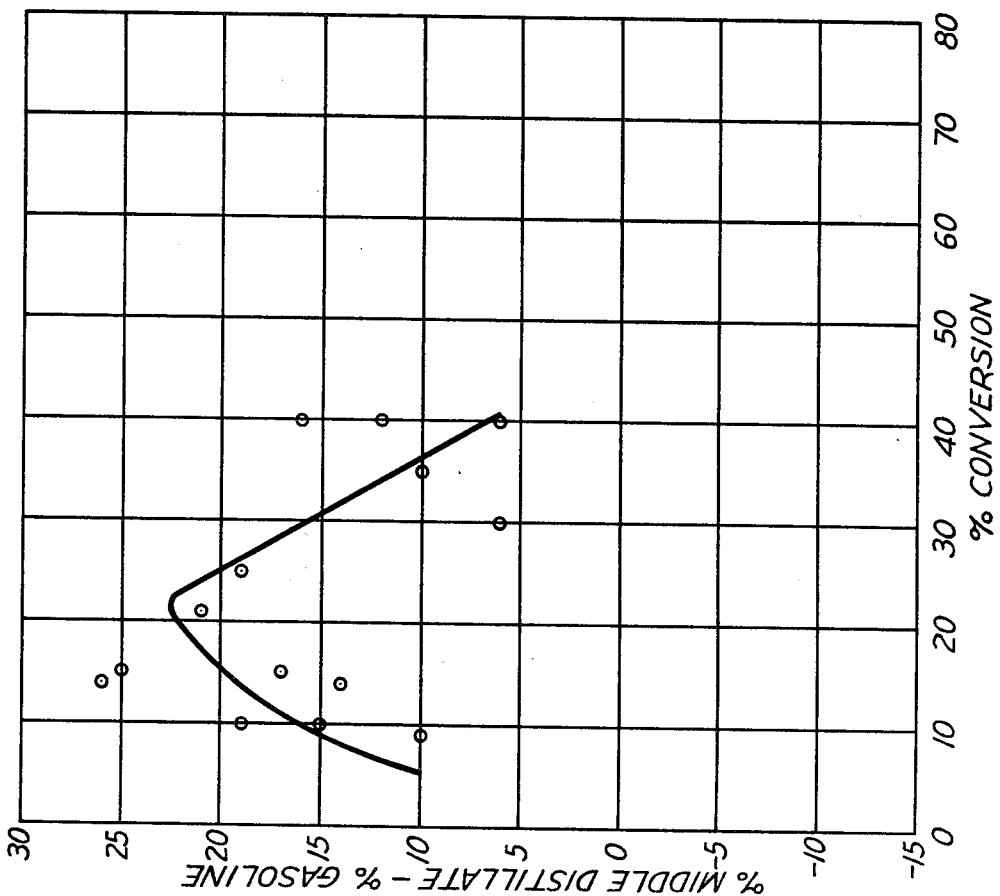

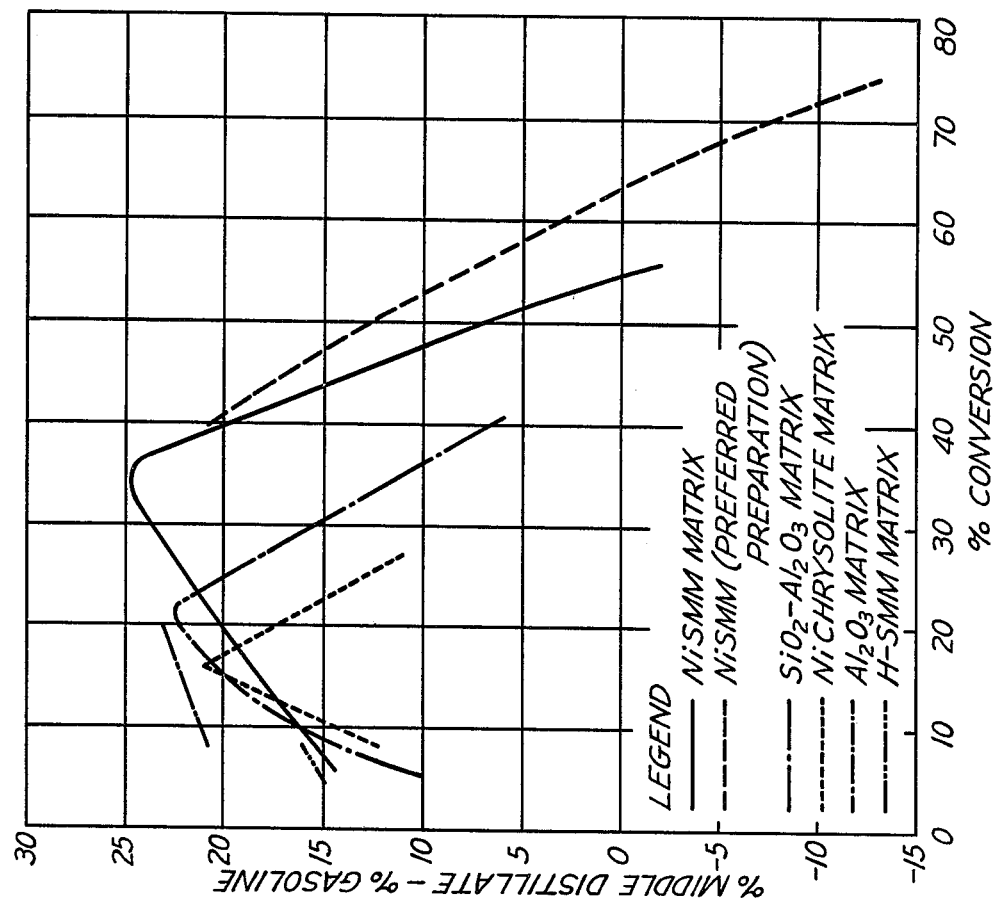
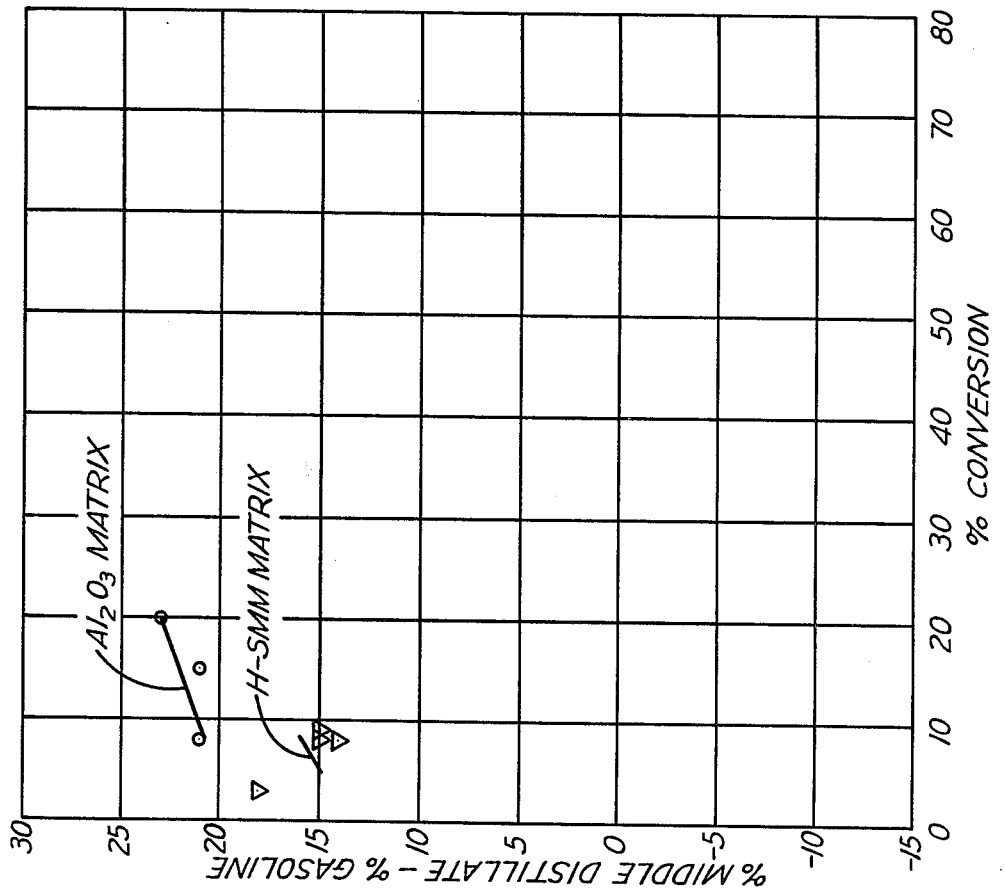

HYDROTREATING PROCESS AND CATALYST

This application is a continuation-in-part of U.S. application Ser. No. 623,374 of Harold E. Swift and Roger F. Vogel, now abandoned and assigned to the same assignee as the present invention.

This invention relates to processes for the catalytic conversion of hydrocarbons in the presence of added hydrogen including hydrocracking and hydrodenitrification in the presence of novel catalyst composites.

BACKGROUND OF THE INVENTION

The use of composite catalysts utilizing a natural or synthetic zeolite as one component are well known in the art for catalytic cracking and hydrotreating processes such as hydrocracking. U.S. Pat. No. 3,558,475 to Jaffe, for example, teaches the use of a catalyst comprising a silica-alumina gel component containing a Group VI hydrogenation component such as Mo or W plus a Group VIII hydrogenation component such as nickel and wherein from 30 to 70 weight percent of a zeolite molecular sieve component free of catalytic metals is dispersed through the gel matrix for the hydrotreating of hydrocarbon charge stocks. Jaffe's catalyst must have at least 15 weight percent silica. A later patent (U.S. Pat. No. 3,598,719 to R. J. White) teaches the use of substantially the same catalyst as Jaffe except the silica content is less than 15 percent (thus pure alumina could be used) for hydrotreating with special emphasis on the high hydrocracking and hydrodenitrification properties of the catalyst with low fouling (good aging).

Improved catalysts for hydrocracking of hydrocarbon charge stocks especially in the presence of nitrogen, e.g., shale oils, are continuously being sought. Further, in some instances it is desirable to hydrocrack the charge stocks to produce higher yields of product which is lower in boiling range than the feedstock, but which contains a favorably high ratio of higher boiling to lower boiling products. For example, hydrocracking of a heavy gas oil to maximize middle distillate rather than gasoline, or hydrocracking a furnace oil to maximize naphtha rather than $C_4$ and lighter gases.

STATEMENT OF THE INVENTION

In accordance with the present invention, an improved hydrocarbon conversion catalyst has been discovered which comprises a novel combination of catalytic components used in particular amounts. More particularly, and in accordance with the present invention, there is provided a catalyst composite comprising:

(A) from 3 to 25 weight percent of tungsten in the form of metal oxide or metal sulfide, or any mixture thereof, calculated as the metal;

(B) from 35 to 80 weight percent of a laminar 2:1 layer-lattice aluminosilicate mineral layer-lattice unit cells, each cell having an inherent negative charge balanced by cations exterior to said unit cell, said mineral corresponding to the following overall formula prior to drying and calcining:

$$[(Al^{3+}{}_{4-ew}Y^{2+}{}_{3w}) \text{ VI } (Q^{4+}{}_{8-x}Al_{3+x})^{IV} O_{20} (OH)_{4-f}F_f] \cdot [dC^y]$$

where Al is aluminum;

Y is selected from the class consisting of nickel, cobalt and mixtures thereof;

Q is at least 0.95 mol fraction silicon ions, the remainder consisting of tetravalent ions having an ionic radius not to exceed 0.65 Å; and F is fluorine;

C is at least one charge balancing cation; and where e has a numerical value from 2 to 3 inclusive;

w has a numerical value from 0.01 to 2 inclusive, with the proviso that the quantity ew have a numerical value from 0.02 to 4 inclusive;

f has a value of 4 or less;

x has a numerical value from 0.05 to 2.0 inclusive;

y is the valence of the cation C;

d is the number of cations C where the product $dy = x + 3(e-2)w$;

and wherein said first bracket represents said layer-lattice unit cell formulation and said second bracket represents said charge-balancing cations; and (C) from 5 to 50 weight percent of a crystalline zeolite having an alpha value of at least 20;

and where in said composite the tungsten component is dispersed uniformly through said laminar 2:1 layer-lattice aluminosilicate mineral component.

In one preferred form of the invention, the zeolite component is thoroughly dispersed into the layer-lattice aluminosilicate mineral component before the tungsten component is dispersed therein.

The catalyst composites of this invention are further characterized in having a low bulk density in the range of 0.4 to 0.85 grams per cubic centimeter. The bulk density of a catalyst is determined by measuring exactly 15 cc of catalyst which is to be charged to the reactor and weighing it. Density is then grams/cm³ of catalyst.

In one added aspect of the present invention, the above-described catalyst composites are used for the hydrocracking of hydrocarbon charge stocks containing substantial amounts of materials boiling above 200° F. (93° C.) such as petroleum distillates; solvent deasphalted petroleum residues, shale oils; and coal derived liquids such as gas oils derived from the catalytic liquefaction of coal or coal tar distillates to obtain a conversion of at least 25% by volume of said charge stock. These hydrocarbon charge stocks are contacted with the catalysts of this invention in a reaction zone with added hydrogen in a conventional maner such as a fixed bed upflow or downflow operation to obtain the desired conversions under hydrocracking conditions which usually include a temperature of at least 400° F. (204° C.), and preferably at least 500° F. (260° C.), to an upper limit of about 850° F. or 950° F. (454° C. or 510° C.). The operating pressure is not critical and suitably can be from 800 to 3500 psig or higher, although it is one of the features of the process of this invention that hydrodenitrification can occur at relatively low pressures of about 800 to 1800 psig using the novel catalysts of this invention. The liquid hourly space velocity is suitably in the range of 0.1 to 5.0, preferably 0.5 to 2.5, volumes of charge stock per volume of catalyst per hour to achieve the desired conversion levels. Usually from 2000 to 15,000 SCF of hydrogen is added per barrel of charge stock, although rates as low as 800 or as high as 20,000 SCF can be used if desired.

DETAILED DESCRIPTION OF CATALYST

The catalyst for use in the present invention comprises a novel combination of three components which are incorporated together in particularly defined amounts, and, in one preferred embodiment, in a particularly defined way.

The three components are, in general, (1) a subgroup of a nickel and/or cobalt substituted laminar 2:1 layer-lattice aluminosolicate mineral; (2) tungsten in the form of its oxide and/or sulfide; and (3) a particulate crystalline zeolite having an alpha value of at least 20. Each of these components, their method of preparation, their relationship to each other in the catalyst composite and their relative proportion in the catalyst composite will be described in the following paragraphs.

(1) Laminar Aluminosilicate Mineral

The laminar 2:1 layer-lattice aluminosilicate mineral component for use in the catalyst of this invention is a subgroup of the aluminosilicate minerals described by Granquist in U.S. Pat. No. 3,852,405, issued on Dec. 3, 1974. The minerals described by Granquist include a number of metal substituted aluminosilicates wherein the metal used in substituting can be Ni, Co, Cr, Mn, Fe, Cu, Ga, Rh, Sc, Zn and Mg. The only proxy metals of interest in the present invention are nickel or cobalt or mixtures thereof. Thus, the metal substituted claylike mineral component used in the catalysts of this invention is a subgroup of those described by Granquist, and is a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

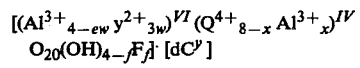

$$[(Al^{3+}{}_{4-ew} Y^{2+}{}_{3w})^{VI} (Q^{4+}{}_{8-x} Al^{3+}{}_{x})^{IV}$$
$$O_{20}(OH)_{4-f}F_f] \cdot [dC^y]$$

where Al is aluminum;
Y is selected from the class consisting of nickel, cobalt and mixtures thereof;
Q is at least 0.95 mol fraction silicon ions, the remainder consisting of tetravalent ions having an ionic radius not to exceed 0.65 Å;
F is fluorine;
C is at least one charge-balancing cation; and
where e has a numerical value from 2 to 3 inclusive;
w has a numerical value from 0.01 to 2 inclusive, with the proviso that the quantity ew have a numerical value from 0.02 to 4 inclusive;
f has a value of 4 or less;
x has a numerical value from 0.05 to 2.0 inclusive;
Y is the valence of the cation C; and
d is the number of cations C where the product dy = x + 3(e−2)w.

In the above formulation, the first bracket represents the overall average laminar layer-lattice unit cell structure formulation, which, as will be explained, possesses an inherent negative charge by reason of the fact that the positive charges of the cations are less than the negative charges of the anions. Since the preparation as a whole is electrostatically neutral, the charge-balancing cations which are necessarily present are external to the lattice and are represented by the second bracket, in which C stands for the charge-balancing cations taken as a whole, with y being their average charge and d being the number of charge-balancing cations per unit cell. In this formulation, C may actually correspond to a large variety of charge-balancing cations simultaneously present, such as, for example, a mixture of hydrogen, calcium, and the like cations. For catalytic purposes, it is preferred that the mineral be free of alkali metals which can occur in the exchange sites (C) due to the presence of alkali metals, for example, in the preparative solutions. Minor amounts of alkali metals, such as 5% to 10% of the exchange sites, or as much as 35% of the exchange sites, can be tolerated.

It is clear from the formulation given that Y consists of divalent nickel or cobalt ions either isomorphously substituted for a like number of aluminum ions, whereby a charge deficit results, or substituted on the basis of three divalent ions for two aluminum trivalent ions with no resulting charge deficit, or a mixture of both. In like manner, it is clear that Q, while consisting predominantly of silicon ions, may include a minor proportion of tetravalent ions isomorphously substituted for some of the silicon ion without affecting the overall charge; while trivalent aluminum ions in a proportion represented by subscript x are isomorphously substituted for a like number of silicon ions, whereby a charge deficit results from the substitution of a trivalent ion for a tetravalent ion.

For the sake of convenience, a tabulation follows in which the Y and Q elements usable in accordance with the invention are listed. It will be clear that this listing results from checking each element against its known valence states and its known ionic radius for each applicable valence state, taking into account the coordination number where the latter affects the ionic radius. Tables of ionic radii for various elements have appeared in the literature during the last half century, and in the case of disparity among the values given for a specified element, the best value has been chosen in light of all of the known data; and this best value is the one which appears in the tables which follow.

TABLE A

| Y: Divalent - Maximum 0.75 Å | | |
|---|---|---|
| Nickel | (Ni) | 0.69 |
| Cobalt | (Co) | 0.72 |

TABLE B

| Q: Tetravalent - Maximum 0.65 Å | | |
|---|---|---|
| Silicon | (Si) | 0.41 |
| Germanium | (Ge) | 0.53 |

Preferably, in the above unit cell formula, Q is silicon. Further, the value of e is preferably about 2; the value of w from 0.2 to 1.66 with the value of ew being preferably from 0.4 to 3.32. The value of x is preferably from 0.5 to 2, and the value of f is preferably from 0.5 to 3.75.

Moreover, usually, although not necessarily, the composition of the charge-balancing cations in the second bracket contains some proportion of the partial hydroxides of aluminum. Thus, in accordance with a more particular formulation, the composition of the charge-balancing cations in the second bracket contains some proportion of the partial hydroxides of aluminum. Thus, in accordance with a more particular formulation, the composition of the charge-balancing cations in the second bracket may conveniently be represented as follows:

$$a M^n + b Al (OH)_{z3-z}$$

wherein $$an + bz = dy = x + 3(e-2)w$$

and M is at least one charge-balancing cation and is preferably selected from the group consisting of hydrogen; ammonium; substituted ammonium; substituted phosphonium; multivalent metal cations other than aluminum; and partial hydroxides of multivalent metal cations; and n is the unsatisfied valence of M. In practice, the product bz is a small value compared to the product an.

This second, more particular characterization of the charge-balancing cations is believed to correspond more closely to the products initially obtained in accordance with the preferred mode of preparation. Moreover, it provides explicitly for any hydroxyaluminum cations which may be present. It will be understood that such hydroxyaluminum cations are commonly present as a mixture of species, as described, for example, in U.S. Geological Survey Water-Supply Paper 1827-A (1967), which is incorporated herein by reference. However, since these charge-balancing cations are essentially exchangeable without disturbing the lattice itself, the latter being represented by the first bracket, after having made a given preparation in accordance with the invention by a preferred procedure, it is relatively simple to exchange a portion of the cations represented by M or indeed substantially all of the cations represented by M in the second bracket for some other preselected cation or mixture of cations. The partial hydroxides of aluminum are exchangeable with difficulty, if at all. Thus, for example, referring to the first general formulation given, the charge-balancing cation C can at will be selected from such diverse species as palladium, hydroxyaluminum, hydroxynickel, trimethylammonium, alkyl phosphonium, and the like cations, and indeed mixtures thereof. Thus, C may be selected from the group consisting of alkaline earth metal, heavy metal, heavy metal partial hydroxides, ammonium, substituted ammonium, substituted phosphonium, and the like cations and mixtures thereof. As noted, alkali metals are preferably excluded but may be present in minor amounts.

In the case of the use of substituted ammonium and substituted phosphonium ions and the like, the substituents should be such that they can be driven off during calcination of the mineral.

Those skilled in the art will recognize, accordingly, that the first bracket of the above formula relates to a fixed array of ions in a tripartite lamina which for convenience may be described as muscovite-like, and in which the positive ions shown in the first parentheses are in octahedral coordination with sheets comprising oxygen, hydroxyl, and fluoride ions; whereas the positive ions shown in the second parentheses in the first bracket are in tetrahedral coordination jointly with the aforesaid sheets of oxygen, hydroxyl, and fluoride ions, and also with sheets of oxygen ions in essentially a hexagonal ring array constituting the external faces of the tripartite lamina. The positive ions shown in the second bracket have no essentially fixed position, but are in effect external to the lattice of the tripartite lamina.

Those skilled in the art will also recognize that when some of the parameters in the above formulations have values outside of the stipulated ranges, the formulations reduce to representations of various end members of a broad group of laminar aluminosilicates, which of course are outside of the scope of the present invention. Thus, for example, when w and x both equal zero, and no fluoride ion is present, the first bracket describes the mineral pyrophyllite. It will also be seen that the factor d is equal to zero, when w and x equal zero, so that the ionic species set forth in the second bracket are not present, which of course results from the fact that the lattice of pyrophyllite is charge-balanced. Again, for the case in which x equals zero, w equals two, e equals two, and no fluoride is present, a mineral results in which the lattice is likewise charge-balanced, and the ionic species set forth in the second bracket are not present. Such a mineral is described in U.S. Pat. No. 2,658,875 to Cornelis et al.

In general, 2:1 layer-lattice aluminosilicate minerals, or in alternative nomenclature, tripartite aluminosilicate minerals of the type concerned in the present invention, may be classified as either dioctahedral or trioctahedral, depending upon whether the number of cations per unit cell in the octahedral (or inner) layer is approximately 4 or 6, respectively. The foregoing structural formula is, as stated, an overall formula for a given preparation, and the fact that the number of such octahedral cations may vary from 4 to 6 in a continuous manner in the formulation given does not mean that a single lamina is present having such an intermediate number of cations. In point of fact, the individual laminae are believed to be either dioctahedral or trioctahedral, and in a given preparation the relative proportions of the dioctahedral and trioctahedral species will give rise to the numerical values obtained in quantitatively characterizing the preparation in accordance with the foregoing formula. Where e in the formulation is intermediate between 2 and 3, accordingly, both 1:1 and 3:2 substitutions are present. Because of the extremely small particle size of the minerals, the exact physical nature of these mixed phase systems is uncertain. In any case, in this specification, the term "a mineral" shall mean the 2:1 layer lattice products which are produced by simultaneously synthesizing both the dioctahedral and trioctahedral phases in place in a single reaction mixture. It may be emphasized that such mineral made for use in this invention is a single mineral species, even though it may contain two phases. The minerals of this invention, therefore, differ significantly from compositionally similar mixtures obtained by simply mixing together the separately synthesized dioctahedral and trioctahedral members.

The mineral component can be synthesized by a hydrothermal route as taught by W. T. Granquist in U.S. Pat. No. 3,852,405. As will be evident from the structural formula already given, the reaction mixture for the hydrothermal synthesis includes a source of one or more multivalent cations other than aluminum and silicon. For example, for the case of nickel, this may be a relatively soluble compound, such as, for example, nickel acetate, nickel fluoride, nickel nitrate, and the like; or it may be a relatively insoluble nickel compound such as nickel hydroxide. It is of interest that in general the inclusion of soluble nickel salts in the reaction mixture tends to cause the nickle to occur predominantly in the trioctahedral phase, while relatively insoluble nickel compounds promote its occurrence in the dioctahedral phase. The terms are well understood in the art, and a brief explanation in addition to that already given may be found on page 156 of the book by George Brown, "The X-Ray Identification and Crystal Structures of Clay Minerals," London, 1961. The classical paper by Ross and Hendricks, "Minerals of the Montmorillonite Group," U.S. Geological Survey Professional Paper 205-B (1945), is helpful, particularly for its treatment of variation of the members of a given series of laminar aluminosilicate minerals.

For the other elements useful in practicing the invention, such as cobalt, the most commonly available simple inorganic and organic compounds thereof may in general be used, as will be evident to those skilled in the art.

The mineral component after its preparation is suitably dried and calcined. By "drying" is meant the removal of the external water of absorption by heating. Usually the drying temperatures are from 250° to 350° F. (121° to 177° C.) at atmospheric pressure, albeit higher and lower pressures can, of course, be employed. By "calcining" is meant the addition of heat to effect some chemical change in the catalyst, such as the removal of chemically bound water or ammonia if the charge-balancing cation is $NH_4^+$. The calcining temperatures are normally from about 800° F. to about 1300° F. (427° C. to about 704° C.). Atmospheric pressure is usually employed, but higher or lower pressures can, of course, be used. The maximum calcination temperature should be below that temperature wherein a phase inversion may occur. Thus, dehydration of the dioctahedral phase may preferably occur at normal calcination temperatures, but increased temperatures tend to result in dehydration of the trioctahedral phase which may then recrystallize to form a new undesired mineral species. Minor amounts of ammonium, substituted ammonium, etc., type ions which can be changed during the drying and calcining cycle may remain. Usually C in the formula after drying and calcining is selected from the group consisting of $H^+$, a multivalent metal cation, or the partial hydroxide of a multivalent metal cation.

It is to be understood that the mineral component can be used in the wet prepared state, but this is not preferred. It is preferred that the metal incorporated in the mineral be nickel and its concentration (or that of cobalt) be in the range of 0.1 to 35 weight percent of the mineral component, preferably from 2 to 22 weight percent.

The amount of laminar 2:1 layer-lattice aluminosilicate mineral component may range from 35 to 80 weight percent of the total catalyst composite and usually the amount of the mineral component is from 40 to 70 weight percent.

(2) Tungsten Component

The tungsten component is in the form of its oxide or sulfide or any combination thereof. The tungsten component is dispersed as uniformly as possible through the laminar 2:1 layer-lattice aluminosilicate mineral component by deposition or other methods which are well known in the art. By "through" is meant on the surface or throughout the aluminosilicate mineral.

For example, usually and preferably the tungsten is deposited onto the dried or heat activated laminar 2:1 layer-lattice aluminosilicate mineral or mineral plus zeolite from a solution (usually aqueous) of a salt of tungsten which is capable of decomposition to the oxide form via heating and/or calcining in air. The technique of minimum excess solution can suitably be employed or an aqueous solution of a suitable tungsten salt, such as ammonium meta-tungstate, can be added to an aqueous slurry of the formed mineral without intermediate drying or calcining. Since tungsten is too large a metal to proxy for aluminum by substitution in the formation of the aluminosilicate mineral component, the tungsten can even be added during the hydrothermal preparation of the nickel and/of cobalt substituted mineral to save extra steps in the preparation.

The technique of tungsten addition is therefore not critical, and any suitable technique can be employed so long as the tungsten is dispersed uniformly through said laminar 2:1 layer-lattice aluminosilicate mineral component. When the zeolite is premixed with the laminar aluminosilicate mineral before the addition of the tungsten component (the preferred technique of this invention), the tungsten would be expected to distribute itself uniformly on the surfaces of both the zeolite and laminar aluminosilicate mineral components.

The amount of tungsten is suitably from 3 to 25 weight percent, and preferably from 6 to 20 weight percent of the total catalyst composite, calculated as the metal.

(3) Zeolite

The zeolite which can be used in the catalysts of this invention are those natural or synthetic crystalline zeolites having an alpha value of at least 20. The "alpha value" is really a measure of the cracking activity of the zeolite and is defined by P. B. Weisz and J. N. Miale in their letter entitled "Superactive Crystalline Aluminosilicate Hydrocarbon Catalysts", appearing in the Journal of Catalysis 4, 527–529 (1965). Preferably, the zeolites have an alpha value from 20 to 20,000.

Generally, the crystalline zeolites are those zeolitic molecular sieves which are well-known components of hydrocracking and other hydroprocessing catalysts. Suitable zeolites are such as those described in recently issued U.S. Pat. No. 3,890,247 entitled "Hydrocracking Catalyst", issued to Dean Young. These zeolites are aluminosilicates such as those of the Y (including ultrastable Y), X, A, L, T, $\Omega$ and B crystal types, as well as zeolites found in nature, such as, for example, mordenite, stilbite, heulandite, ferrierite chabazite, and the like. The preferred crystalline zeolites are those having crystal pore diameters between about 6 Å to 15 Å, wherein the $SiO_2$—$Al_2O_3$ mole ratio is about 3:1 to 10:1. For most catalytic purposes, e.g., catalytic hydrocracking, it is preferable to replace most or all of the zeolitic alkali metal cations normally associated with such zeolites with other cations, particularly hydrogen ions and/or polyvalent metal ions such as cobalt, nickel, magnesium, zinc, rare earth metals, and the like. A particularly desirable form of zeolite is a stabilized hydrogen Y zeolite prepared by first exchanging a major proportion of the zeolitic sodium ions with ammonium ions, then calcining the partially exchanged material in the presence of steam at temperatures of about 700° to 1200° F., then reexchanging the once-calcined material with ammonium salt to reduce the sodium content to below about 0.5 weight percent. Another particularly desired form of the zeolite is prepared by exchanging into a suitable zeolite, particularly Y zeolite, a stabilizing proportion of a Group VIII metal, particularly nickel, platinum of palladium and then calcining the resulting metal zeolite. The zeolite component may be prepared by any method well known in the art.

The amount of the zeolitic component may range from 5 to 50 weight percent of the total catalyst, preferably from 10 to 35 weight percent of the total catalyst composite.

It has been found, as will be shown below, that if the tungsten component is dispersed on the zeolitic component, before dispersion into the laminar aluminosilicate mineral component, a catalyst with poor activity results. In view of this, it was believed that the simplest method of preparing a suitable catalyst composite was to deposit or disperse the tungsten onto the laminar aluminosilicate mineral to form a matrix and thereafter disperse the zeolite in particulated form throughout the matrix. Surprisingly, it has been found in one particularly preferred form of the invention that the most active catalyst results when the tungsten is deposited on a composite of the zeolite dispersed throughout the laminar aluminosilicate mineral.

It is also within the contemplation of this invention to disperse the crystalline zeolitic component throughout the laminar aluminosilicate mineral component by formation of the mineral around the zeolitic component. The tungsten can also be added in this one-step procedure by well known procedures in the art.

The composite catalyst is normally dried and calcined at conventional conditions, and at this point, the tungsten is substantially entirely present in the oxide form. It can be used as such or partially or completely converted to the sulfide form by conventional techniques such as by contact with a mixture of $H_2$ and $H_2S$. The tungsten component tends to become sulfided in any event during operation from any sulfur content present in the charge stock.

CHARGE STOCKS

The charge stocks for processing with the catalyst of the present invention are hydrocarbon type charge stocks which are liquid at processing conditions. Such charge stocks can be suitably derived from many sources such as petroleum, tar sands, oil shale, coal and the like. More specifically, petroleum distillates, solvent deasphalted petroleum residua, shale oils and coal-derived liquids or coal tar distillates are suitable. Usually the charge stocks contain substantial amounts of materials boiling above 200° F. (93° C.); preferably, substantial amounts of materials boiling in the range of 350° to 1100° F. (177° to 593° C.).

Suitable charge stocks include those heavy distillates normally defined as furnace oil (350° F. to 675° F. (177° to 357° C.)); full range (350° F.+ (177° C.+)) or heavy (675° F.+(357° C.+) gas oils; both straight-run and cracked as well as conventional FCC feed and portions thereof. The cracked stocks may be obtained from thermal or catalytic cracking of various stocks, including those derived from petroleum, coal, shale and coal tar. The charge stocks normally contain non-hydrocarbon impurities such as nitrogen, sulfur, and metals, albeit these impurities are mostly chemically combined with carbon and are removed or released by means of a hydrocracking type of reaction. Because of the superior activity and stability of the catalysts of this invention, the charge stocks need not be subjected to a prior treatment with hydrogen (so-called "hydrofining") to reduce the level of such impurities before being used in the hydrocarbon conversion process of the present invention. Although "clean" hydrocarbon type charge stocks can be treated with the catalysts of the invention, the catalysts are primarily useful for the treatment of charge stocks containing a substantial amount of nitrogen. Charge stocks having a nitrogen content typically ranging from 350 to 4000 ppm, usually 500 to 2000 ppm, and most usually from 700 to 1800 ppm, can be treated by the catalysts of this invention to produce a product having less than 10 ppm of nitrogen. Several weight percent sulfur can also be tolerated, although the charge stocks usually contain from 0.1 to 2.5 weight percent sulfur. The metals level obviously varies depending on the source of the charge stock, but usually the metals content is from 1 to 5 ppm, mostly in the form of nickel and vanadium, although copper, iron and other metals may be present.

TYPE OF OPERATION

Usually a fixed-bed downflow operation is employed, but fluid-bed or other types of catalyst charge stock contacting unit operations can be employed. The hydrocracking zone can suitably be operated at a temperature of at least 400° F. (204° C.), preferably at least 500° F. (260° C.), but usually at a temperature below 950° F. (510° C.), preferably below 850° F. (454° C.). The reaction pressure is not critical but usually is in excess of 1000 psig (6.9 MPa), although pressures as low as 800 psig (5.5 MPa) can be employed. Preferably the pressure is above 1000 psig but below 3500 psig (24.1 MPa) for economic reasons. Higher pressures can, of course, be used, but it is one of the features of the catalysts of this invention that they operate successfully at relatively low pressures of 800 to 1800 psig (5.5 MPa to 12.4 MPa). The liquid hourly space velocity of the charge stock is suitably in the range of 0.25 to 5.0 volumes of charge stock per volume of catalyst per hour, with the preferred range of space velocity being from 0.5 to 2.5 v/v/hr. Hydrogen is usually supplied at a total rate of 800 to 20,000, preferably 2,000 to 15,000 SCF per barrel of charge stock. The hydrogen is usually used in the purity range of 80 to 90 weight percent hydrogen, although an $H_2$ purity as low as 70 weight percent can be used, and obviously 100% $H_2$ can be employed.

CONVERSION LEVEL

It has been found that the catalysts of this invention which comprise (1) tungsten, (2) a laminar aluminosilicate wherein a portion of the aluminum is isomorphously substituted with Ni and/or Co and (3) a zeolite; said three components being combined in certain specific ways, behave in a hydrocracking environment in a manner similar to other zeolite containing hydrocracking catalysts at low conversion levels of less than about 25 volume % of the charge stock. At conversion levels above about 25 volume %, the catalysts of this invention exhibit unexpectedly better selectivity to the production of higher boiling (albeit lower than the boiling range of the charge stock) to lower boiling products than other zeolite containing catalysts which are similar to the catalysts of this invention, except for the substitution of a different matrix for the Ni and/or Co substituted laminar aluminosilicate component. The term "conversion" in this application shall mean per pass conversion and shall mean 100 minus the volume percent of the product boiling substantially in the same range as the charge stock. As noted above, the zeolite containing catalysts of this invention result in unexpectedly high selectivities to higher boiling products, provided the conversion of the charge stock is above 25 volume %, usually over 30%. To reduce the expense of recycle operation, it is normally desirable to operate at a conversion level per pass above 50%, usually with the maximum conversion per pass being in the range of 60% to 70%; although even at conversion levels of 90% of above per pass, the selectivity advantages of the catalysts of this invention can be realized, although the degree of advantage may be reduced. Usually then the conversion level is from 30% to 80%, with the preferred conversions being from 40% to 75%, and the more preferred conversions from 50% to 75%.

The invention will be further described with reference to the following experimental work.

EXPERIMENTAL WORK

In all of the examples, except Examples 13 and 21, the zeolite component of the catalyst composite was prepared as follows to convert the zeolite from the commercially available sodium form to the hydrogen-Y form (HY zeolite):

(1) 400 g of commercially available Linde SK-40 (sodium form zeolite) was slurried (mixed) in 2 liters of water and heated to 80° C. with stirring.

(2) 180 g of $NH_4Cl$ was mixed with water to a volume of 300 ml and added to (1). The mixture was slurried two hours at 80° C. to exchange the sodium with $NH_4$.

(3) The slurry (2) was filtered. The cake was reslurried in 2 liters of water which had been heated to 80° C. and again treated with $NH_4Cl$ as in (2).

(4) The slurry (3) was filtered and the cake washed with 4 liters of water.

(5) The cake (4) was dried at 250° F. (121° C.) and calcined at 1000° F. (538° C.) to convert the $NH_4$ to the hydrogen form zeolite.

(6) The procedures of (1) through (4) were repeated with the calcined cake except that the final cake was washed with 18 liters of water.

(7) The filter cake from (6) was dried at 250° F. (121° C.).

(8) The catalyst was ground and screened through 50 mesh.

(9) The sodium level at this point should be less than 0.25 weight percent.

The laminar aluminosilicate mineral component was obtained from Baroid Division of NL Industries, Inc. and was prepared in accordance with the teachings in U.S. Pat. No. 3,852,405.

The terminology "Ni-SMM" is used in the working examples, and this means a nickel-substituted synthetic mica-montmorillonite which is the nickel-substituted laminar 2:1 layer-lattice aluminosilicate mineral described in U.S. Pat. No. 3,852,405.

The charge stocks used in the working Examples below are either of different Agha Jari gas oils or a furnace oil; and the properties of these charge stocks are given in Table 1 below:

TABLE 1
Properties of Charge Stocks

| Inspection | Agha Jari Gas Oils | | | Furnace Oil |
|---|---|---|---|---|
| | LR-18163 | LR-21581 | LR-21506 | LR-21321 |
| Gravity API | 23.0 | 34.1 | 29.3 | 29.1 |
| Sulfur: Wt % | 1.82 | 0.21 | 0.21 | 0.15 |
| Nitrogen: ppm | 1300 | 12 | 42 | 0.4 |
| Hydrocarbon Type: Vol % | | | | |
| Aromatics | 43.9 | 10.7 | 29.7 | 28.0 |
| Saturates | 56.1 | 82.4 | 65.9 | 71.5 |
| Hydrogne: Wt % | 12.03 | 13.68 | 13.19 | 13.36 |
| Distillation, D2887 | | | | |
| 10% at: ° F (° C.) | 632 (333) | 498 (259) | 610 (321) | 381 (194) |
| 30% | 756 (402) | 646 (341) | 730 (388) | 448 (231) |
| 50% | 819 (437) | 736 (391) | 792 (422) | 489 (254) |
| 70% | 880 (471) | 813 (434) | 856 (458) | 532 (278) |
| 90% | 945 (507) | 900 (482) | 928 (498) | 574 (301) |

Unless indicated otherwise in the Examples, the final composite catalyst was pretreated with a gas stream consisting of 92% $H_2$ and 8% $H_2S$ at 600° F. (315° C.) at atmospheric pressure with a flow rate of $8.5 \times 10^{-3}$ $m^3$/hr. (3 SCF/hr) for 2 hours.

The following procedure was employed in all of the working Examples unless otherwise indicated.

The charge stock was passed downflow through a fixed bed of the catalyst at 1500 psig (10.3 MPa); 1.5 LHSV; and 10,000 SCF of $H_2$/bbl (1780 $m^3H_2/m^3$ oil). The temperature was 730° F. (388° C.) during the 8-hour off-stream period and the first 16 hours of onstream operation. The temperature was then increased to 750° F. (399° C.) for the remainder of the run. The total run was for 104 hours, including the 8-hour off-stream and the 16-hour onstream operation. Data in the tables are given for four different but representative 8-hour time periods; i.e. 8-16, 32-40, 56-64 and 80-88 hour time periods designated in the following tables as Time Periods A, B, C and D, respectively.

Unless indicated otherwise, the liquid product was analyzed by gas liquid chromatography (GLC) using ASTM method D-2887, which is a method to determine boiling range distribution of petroleum fractions. In addition, total nitrogen and sulfur contents were obtained. Reactor off-gas composition was determined by mass spectrometry.

The working Examples below are organized into series, and in each series the first Examples define methods of preparing the particular catalyst used in that series, followed by Examples utilizing the catalyst in a process environment. A brief description of the first five series and FIGS. 1 through 6 is given below:

First Series — The preparation of the optimum catalyst is described (tungsten deposited on a mixture of nickel-SMM plus a zeolite). The optimum catalyst is used for hydrocracking a heavy gas oil, and FIG. 1 plots the relationship of "Middle Distillate Minus Gasoline" against conversion.

Second Series — The catalyst of the invention (zeolite combined with tungsten deposited on Ni-SMM). FIG. 2 is a plot similar to that of FIG. 1 except using the catalyst of the Second Series.

Third Series — A known catalyst (zeolite plus silica-alumina matrix) is employed for the hydrocracking of a heavy gas oil. FIG. 3 is similar to FIG. 1 except using the catalyst of the Third Series.

Fourth Series — A catalyst not within the scope of the invention (zeolite plus a nickel chrysotile matrix) is employed. FIG. 4 is simlilar to FIG. 1 except using the catalyst of the Fourth Series.

Fifth Series — This series utilizes two different catalysts, both containing a zeolite and either an alumina matrix or an H-SMM matrix. FIG. 5 is a similar to FIG. 1 except using the catalysts of the Fifth Series.

FIG. 6 is a compilation of all of the curves from FIGS. 1 through 5 and is included for the ease of comparison of the results of the initial first five series of runs.

As noted above, the FIGS. 1 through 6 plot conversion as defined above against a function designated as "Percent Middle Distillate Minus Percent Gasoline". Customarily, the prior art used a ratio of percent middle distillate (defined as "liquid product boiling between 350° and 675° F." (177° and 357° C.) to percent gasoline (defined as liquid product boiling less than 350° F. (177° C.)) to determine selectivity of catalysts to middle distillate. This function, however, is rather insensitive to differences between catalysts, and it is hard to discern a superior preparation. A new function has been developed which does provide a sensitive comparison of catalyst selectivity to middle distillate over a wide range of conversions. This new function is "Volume Percent Middle Distillate Minus Volume Percent Gasoline in the Product."

In the Examples used to prepare FIGS. 1–5, i.e. Examples 1–39, a heavy gas oil was exployed as the charge stock under relatively mild hydrocracking conditions, and as a result the gas yields were minor and were ignored in calculating the conversions. In the final series of Examples (Exs. 40 to 46) both the gas oil and furnace oil were employed under relatively severe hydrocracking conditions, and as a result, significant yields of gases ($C_3$'s and $C_4$'s) were produced and were taken into account in the calculations regarding conversion.

FIRST SERIES OF RUNS

EXAMPLE 1

(Preparation of Preferred Catalyst)

The following procedure was used to make a catalyst where tungsten was impregnated on an admixture of 70 weight percent (15% Ni-SMM) and 30 weight percent HY zeolite. The final catalyst contained 14 weight percent tungsten and had the formula: 14%W/[70%(15% Ni-SMM) + 30% HY zeolite]

(1) 51.8 grams of 15 wt % Ni-SMM (less than 50 mesh size) were blended with 22.20 grams of hydrogen Y zeolite (less than 100 mesh size).

(2) 15.43 grams of ammonium meta-tungstate were dissolved with water to a volume of 95 ml.

(3) Solution (2) was added to the blended solids in (1) and the amount of the solution was just sufficient to bring the blend to the point of incipient wetness.

(4) The solid (3) was dried at 250° F. (121° C.) for 29 hours.

(5) The solid (4) was screened through 100 mesh, then slugged and sized to 14–30 mesh and calcined at 1000° F. (538° C.) for 10 hours.

EXAMPLE 2

A catalyst was made according to the procedure in Example 1 except the preparations of the material were used to result in a catalyst having the formula 14% tungsten deposited on an admixture of 80 wt % (15% Ni-SMM) + 20 wt % HY zeolite.

EXAMPLE 3

A catalyst was made according to the procedure of Example 1 except the nickel level in the Ni-SMM component was 6% by weight rather than 15% by weight.

The catalysts prepared in Examples 1, 2 and 3 above were evaluated in the runs for Examples 4–7. The results of these runs are summarized in Table 2 below.

TABLE 2

CRITICALITY OF TUNGSTEN ADDITION TO CATALYST COMPOSITE

Feed: Agha Jari Heavy Gas Oil
Test Conditions: 1500 psig (10.3 MPa)
1.5 LHSV
10,000 SCF $H_2$/bbl (1780 $m^3 H_2/m^3$ oil)
8 hours off-stream and 16 hours on-stream at 730° F. (388 ° C.)
88 hours on-stream at 750° F. (399° C.)

| Ex. No. | 4 | | | | 5 | | | | 6 | | | | 7[a] | | | |
|---|---|---|---|---|---|---|---|---|---|---|---|---|---|---|---|---|
| Description | (Catalyst per Ex. 1) 14% W/(70% Ni-SMM + 30% HY) | | | | (Catalyst per Ex. 1) 14% W/(70% Ni-SMM + 30% HY) | | | | (Catalyst per Ex. 2) 14% W/(80% Ni-SMM + 20% HY) | | | | (Catalyst per Ex. 3) 14% W/(70% Ni-SMM + 30% HY) | | | |
| Bulk Density ($g/cm^3$) | 0.60 | | | | 0.60 | | | | 0.59 | | | | 0.66 | | | |
| Time Period* | A | B | C | D | A | B | C | D | A | B | C | D | A | B | C | D |
| Conversion, Vol. % | 39 | 51 | 65 | 58 | (57)$^\phi$ | (72) | (69) | (73) | 38 | 48 | 41 | 48 | 20 | 58 | 60 | — |
| MD - G** | 16 | 9 | 1 | 5 | (8) | (−10) | (−7) | (−13) | 20 | 16 | 16 | 18 | 16 | 13 | 1 | — |
| Nitrogen in product, ppm | 1.8 | 1.6 | 0.6 | 0.7 | (1.0) | (2.5) | (1.4) | (0.6) | 3.8 | 0.3 | <0.2 | 0.9 | 250 | 0.6 | 0.5 | — |

[a]6 wt % Ni in Ni-SMM rather than 15 wt % Ni.
*Explained in full previously. Briefly, A = 8–16 hrs; B = 32–40 hrs; C = 56–64 hrs; D = 80–88 hrs.
**"MD-G" in this and other tables means Volume % Middle Distillate Minus Volume % Gasoline.
$^\phi$Figures in parentheses mean "run on a different unit".

The Middle Distillate Minus Gasoline ("MD - G") function data set forth in Table 2 above was plotted against conversion as shown on FIG. 1. Referring to FIG. 1, it can be seen that the conversion levels were about 40–75% under the conditions used and that more middle distillate than gasoline was produced at conversion levels from 40–63%, i.e. MD-G is a positive value.

SECOND SERIES OF RUNS (Preparation of Catalysts of Invention)

EXAMPLE 8

(Preparation of Tungsten Impregnated Ni-SMM Matrix plus Zeolite)

Nickel substituted synthetic mica montmorillonite (15 wt. % Ni-SMM) material was impregnated with an aqueous solution of ammonium meta tungstate by the technique of minimum excess solution (incipient wetness) to deposit the desired amount of tungsten on the Ni-SMM matrix. The following preparation is for 20 weight percent tungsten on the Ni-SMM matrix.

(1) 54.0 grams of Ni-SMM were weighed into a container;

(2) 17.7 grams of ammonium meta-tungstate were dissolved with water to a volume of 78 ml;

(3) The solid (1) was brought to the point of incipient wetness by the addition of all of solution (2);

(4) The wet solid (3) was oven-dried at 250° F. (121° C.) for 17 hours;

(5) The dried solid (4) was crushed and screened through a 100 mesh sieve;

(6) 67.83 grams of the screened solid (5) were blended with 29.07 grams of hydrogen Y zeolite (less than 50 mesh size);

(7) The mixture (6) was formed into cylinders, about 1¼" in diameter by 3" in length using a hydraulic press (slugged), then sized to 14–30 mesh.

(8) The resulting composite catalyst was calcined at 1000° F. (538° C.) for 10 hours.

The final catalyst had the formula 70% (20% W/Ni-SMM) + 30% HY zeolite.

EXAMPLE 9

Example 8 was repeated, except the catalyst contained only 10% tungsten by weight on the Ni-SMM matrix. The final catalyst had the formula:

70% (10% W/Ni-SMM) + 30% HY zeolite

EXAMPLE 10

Example 8 was repeated, except the catalyst contained only 5% tungsten by weight on the Ni-SMM matrix. The final catalyst had the formula:

70% (5% W/Ni-SMM) + 30% HY zeolite

EXAMPLE 11

A catalyst was prepared by the same procedure as in Example 9, except the zeolite level was 20%. The final catalyst had the formula:

80%(10% W/Ni-SMM) + 20% HY zeolite

EXAMPLE 12

A catalyst was prepared by the same procedure as in Example 9, except the zeolite level was 40%. The final catalyst had the formula:

60% (10% W/Ni-SMM) + 40% HY zeolite

EXAMPLE 13

The catalyst preparation of Example 8 was repeated except a nickel substituted Y zeolite was used in place of the hydrogen Y zeolite. The final catalyst had the formula:

70%(20% W/Ni-SMM) + 30% Ni-Y zeolite.

The nickel zeolite was prepared by the following procedure, which is a modification of the procedure set forth in U.S. Pat. No. 3,794,598:

(1) 41.06 grams of nickel acetate were dissolved with water to a volume of 330 ml.

(2) 37.50 grams of HY zeolite were added to the solution, and the mixture was heated to boiling while stirring;

(3) The mixture was boiled for four hours, and at the 1, 2 and 3-hour marks, 7.0 grams of nickel carbonate were added to the mixture;

(4) The slurry was filtered while still hot, and washed with 750 ml of boiling water;

(5) The solid was dried at 250° F. (120° C.) for 24 hours;

(6) the dried solid from (5) was sized through 100-mesh and used to composite with the matrix.

The catalysts prepared in Examples 8–13 above were evaluated in the runs for Examples 14–21, the results of which are shown in Table 3 below.

TABLE 3

TUNGSTEN CONTENT VS. CATALYST ACTIVITY

Feed: Agha Jari Heavy Gas Oil
Test Conditions: 1500 psig (10.3 MPa)
1.5 LHSV
10,000 SCF $H_2$/bbl (1780 $m^3 H_2 m^3$ oil)
8 hours off-stream and 16 hours on-stream at 730° F. (388° C.)
88 hours on-stream at 750° F. (399° C.)

| Ex. No. | 14 | | | | 15* | | | | 16 | | | | 17 | | | |
|---|---|---|---|---|---|---|---|---|---|---|---|---|---|---|---|---|
| Description | (Cat. per Ex. 8) 70% (20% W/Ni-SMM) + 30% HY | | | | (Cat. per Ex. 8) 70% (20% W/Ni-SMM) + 30% HY | | | | (Cat. per Ex. 8) 70% (20% W/Ni-SMM) + 30% HY | | | | (Cat. per Ex. 9) 70% (10% W/Ni-SMM) + 30% HY | | | |
| Bulk Density (g/cm³) | 0.60 | | | | 0.60 | | | | 0.60 | | | | 0.50 | | | |
| Time Period | A | B | C | D | A | B | C | D | A | B | C | D | A | B | C | D |
| Conversion, Vol. % | 27 | 56 | 53 | 53 | — | 47 | 23 | 6 | (39)$^\phi$ | (40) | (56) | (43) | 27 | 43 | 52 | 45 |
| MD - G | 21 | −2 | 1 | −1 | — | 13 | 20 | 14 | (16) | (9) | (7) | (11) | 22 | 13 | 8 | 14 |
| Nitrogen in product, ppm | 0.9 | 1.0 | 4.7 | 1.1 | 0.9 | 0.8 | 1.3 | 21 | (4.4) | (1.7) | (3.7) | (2.4) | 33 | 3.5 | 6.1 | 3.7 |

| Ex. No. | 18 | | | | 19 | | | | 20 | | | | 21 | | | |
|---|---|---|---|---|---|---|---|---|---|---|---|---|---|---|---|---|
| Description | (Cat. per Ex. 10) 70% (5% W/Ni-SMM) + 30% HY | | | | (Cat. per Ex. 11) 80% (10% W/Ni-SMM) + 20% HY | | | | (Cat. per Ex. 12) 60% (10% W/Ni-SMM) + 40% HY | | | | (Cat. per Ex. 13) 70% (20% W/Ni-SMM) + 30% Ni-Y | | | |
| Bulk Density (g/cm³) | 0.53 | | | | 0.55 | | | | 0.58 | | | | 0.59 | | | |
| Time Period | A | B | C | D | A | B | C | D | A | B | C | D | A | B | C | D |
| Conversion, Vol. % | — | 21 | 20 | 11 | 44 | 45 | 41 | 40 | 40 | 31 | — | 36 | (45)$^\phi$ | (52) | (57) | (49) |
| MD - G | — | 24 | 19 | 23 | 20 | 18 | 23 | 23 | 20 | 27 | — | 23 | (8) | (8) | (−2) | (6) |
| Nitrogen in product, ppm | 114 | 25 | 60 | 69 | 8.6 | 5.1 | 8.1 | 4.6 | 13 | 7.5 | 2.3 | 4.7 | (1.3) | (0.6) | (1.2) | (1.3) |

$^\phi$Figures in parentheses mean "run on a different unit"
*Reaction pressure was 1800 psig and temperature was 735° F. (391° C.) for all periods.

The Middle Distillate Minus Gasoline ("MD - G") function data set forth in Table 3 above were plotted against conversion as shown on FIG. 2. Referring to FIG. 2, it can be seen that the conversion levels were about 5% to 56%. The optimum middle distillate to gasoline production appeared to be achieved at conversions of 30% to 40%, and the production of gasoline did not surpass the production of middle distillate until conversions of over about 55% were achieved, i.e. MD - G becomes a negative number.

COMPARISON BASE RUNS

The following two Examples provide comparison base runs to the catalysts described in the First and Second Series of runs above.

EXAMPLE 22

(No Tungsten)

A composite catalyst consisting of 80% by weight of 15% by weight Ni-SMM (<100 mesh size) plus 20% by weight of HY zeolite (< 50 mesh size) was made by mixing these components and forming them into 14 to 30 mesh particles. This catalyst had no tungsten.

The run was begun at 730° F. (388° C.) and the temperature was incresed in 10° F (5° C.) increments after each 8-hour period in which little conversion was noted (product °API was less than 37).

Conversion was insignificant at 750°F. (399° C.). Temperature had to be raised to 800° F. (427° C.) before a volume percent conversion of 32% and 34% could be achieved in the respective Time Periods C (56 to 64 hours) and D (80 to 88 hours). The nitrogen content of the product during these same Time Periods was 170 and 270 ppm, respectively.

EXAMPLE 23

The following procedure was used to make a catalyst in which the tunsten was impregnated on only the zeolite portion of the catalyst composite. The zeolite portion was impregnated to contain 20 weight percent tungsten.

(1) 30.78 grams of HY zeolite were weighed into a container.

(2) 10.10 grams of ammonium meta-tungstate were dissolved with water to a volume of 40 ml.

(3) The solid (1) was brought to the point of incipient wetness by impregnation with solution (2).

(4) The solid from (3) was oven dried for 25 hours at 250° F. (121° C.)

(5) After screening through 100 mesh, 25.71 grams of the dried solid from (4) were thoroughly blended with 60.0 grams of 15 weight percent Ni-SMM (less than 100 mesh size).

(6) The blend from (5) was slugged and sized to 14–30 mesh and calcined for 10 hours at 1000° F. (538° C.).

The formula for the catalyst from Example 23 is:

70% Ni-SMM + 30% (20% W/HY)

The bulk density of the catalyst was found to be 0.44 g/cm$^3$. The catalyst of this Example 23 was employed in the same manner and using the same charge stock and reaction conditions as shown for the Examples in Tables 2 and 3 above, but the run was terminated after completion of 8 hours off-stream and 16 hours on-stream because the catalyst conversion was only about 19% and the nitrogen in the product was 730 ppm.

A comparison of the results from Tables 2 and 3 and Examples 22 and 23 show that the activity of the catalyst is affected by whether tungsten is present (Ex. 22 shows that in the absence of tungsten, very little activity is obtained) and, surprisingly, on the manner in which the tungsten is present. Thus the most active and selective catalyst for the production of middle distillate was found to be the catalyst prepared by depositing tungsten on an admixture of the zeolite and the nickel-SMM components as described in Examples 1–7 above; and the next most active and selective catalyst was the catalyst wherein the tungsten is distributed uniformly throughout the Ni-SMM component before admixture with the zeolite as described in Examples 8–21 above. Example 23 shows that the addition of tungsten to the zeolite followed by admixture with the Ni-SMM component results in a very poor catalyst.

As will be shown in the data below, however, the catalysts of this invention only exhibit improved selectivity when the conversion level is above about 25 volume percent of the charge stock.

THIRD SERIES OF RUNS

This series of runs illustrates the preparation of a catalyst outside the scope of the invention which uses a silica-alumina matrix in lieu of the Ni-SMM component of the catalysts of this invention.

EXAMPLE 24

The following procedure was used to make a catalyst where nickel and tungsten were impregnated onto Triple A silica-alumina. This material was admixed with HY zeolite. The catalyst contained 11% nickel and 20% tungsten on the silica-alumina component.

(1) 70.7 grams of Triple A silica-alumina were impregnated with 75.15 grams of nickel nitrate hexahydrate and 28.68 grams of ammonium meta-tungstate which was dissolved to a volume of 120 cc's of water. The amount of solution was just sufficient to bring the blend to the point of incipient wetness.

(2) The catalyst was heated at 250° F. (120° C.) for 20 hours;

(3) It was screened through 100-mesh;

(4) 61.00 grams of the powder from (3) were blended with 26.14 grams of HY zeolite;

(5) The powder from (4) was slugged and sized to 14–30 mesh and calcined at 1000° F. (538° C.) for 10 hours.

The catalyst had the formula:

70%[11% Ni + 20%W/SiO$_2$-Al$_2$O$_3$] + 30% HY zeolite

EXAMPLE 25

The following procedure was used to make a catalyst where nickel and tungsten were impregnated on an admixture of Triple A silica-alumina and HY Zeolite. The catalyst contained 8.6 weight percent nickel and 14 weight percent tungsten.

(1) 50.00 grams of calcined Triple A silica-alumina and 29.40 grams of hydrogen Y zeolite (−100 mesh) were thoroughly blended.

(2) 59.05 grams of Ni(NO$_3$)$_2$.6H$_2$O and 20.46 grams of ammonium meta-tungstate were dissolved with water to a volume of 113 cc.

(3) Solution (2) was added to the blended solids in (1) and the amount of solution was just sufficient to bring the blend to the point of incipient wetness.

(4) The solid (3) was dried at 250° F. (121° C.) for 22 hours.

(5) The solid (4) was screened through 100 mesh then slugged and sized to 14–30 mesh and calcined at 1000° F. (538° C.) for ten hours.

The formula for the catalyst is (8.6% Ni + 14% W)/(70% SiO$_2$-Al$_2$O$_3$ + 30% HY).

EXAMPLE 26

The following procedure was used to make a catalyst where nickel was impregnated onto Triple A silica alumina. This material was admixed with HY zeolite. The catalyst was then impregnated with tungsten to give 14 wt% tungsten on the final catalyst.

(1) 82.90 grams of calcined Triple A silica-alumina was impregnated with 97.90 grams of nickel nitrate hexahydrate dissolved to a volume of 150 cc's with water. The amount of solution was just sufficient to bring the blend to the point of incipient wetness.

(2) The catalyst was dried at 250° F. (121° C.) for 20 hours.

(3) 74.40 grams of the dried powder were blended with 31.89 grams of hydrogen Y zeolite.

(4) 22.21 grams of ammonium meta-tungstate were dissolved to a volume of 90 cc with water.

(5) The solution from (4) was added to the solid from (3) and thoroughly mixed. The amount of solution was just sufficient to reach the point of incipient wetness.

(6) The solid (5) was dried at 250° F. (121° C.) for 24 hours.

(7) The powder from (6) was slugged and sized to 14–30 mesh and calcined at 1000° F. (538° C.) for ten hours.

The formula for the catalyst is 14% $W/[70\%(15\%Ni/SiO_2-Al_2O_3) + 30\% HY]$.

EXAMPLE 27

A catalyst was prepared in accordance with the procedure of Example 26 above except in lieu of the silica-alumina Triple A matrix, a silica-alumina was employed which was purchased from Nalco Chemical Company and designated "Fluffo". The silica-alumina had a surface area of 279.8 m²/g; a pore volume of 0.94 cc/g; and an average pore radius of 132.4 A. The formula for this catalyst is:

$$14\% W/[70\%(15\% Ni/SiO_2-Al_2O_3) + 30\% HY]$$

The catalysts from Examples 24–27 were employed in the runs for Examples 28–31, and the results are summarized in Table 4 below.

cates a lower activity catalyst. In addition, it may be seen that little difference in selectivity of the catalysts is noted below a conversion of 25%. However, as conversion increases beyond this point, the Ni-SMM matrix catalysts show a significant advantage in selectivity to higher boiling products.

FOURTH SERIES OF RUNS

This series of runs illustrates another preparation of a catalyst outside the scope of the invention which uses a nickel chrysotile matrix in lieu of the nickel-SMM component of the catalysts of the invention.

EXAMPLE 32

The following procedure was used to make a catalyst where tungsten was impregnated onto a nickel chrysotile support. This material was then admixed with an HY zeolite. The final catalyst contained 39% nickel and 5% tungsten.

Nickel chrysotile was impregnated with an aqueous solution of ammonium meta-tungstate by the technique of minimum excess solution (incipient wetness) to deposit the desired amount of tungsten on the matrix. The following preparation is for 5% tungsten on the matrix.

(1) 111.0 grams of nickel chrysotile obtained from NL Industries, Baroid Division, was weighed into a container.

(2) 7.25 grams of ammonium meta-tungstate were dissolved with water to a volume of 115 cc.

(3) The solid (1) was brought to the point of incipient wetness by the addition of all of solution (2).

(4) The wet solid was oven dried at 250° F. (121° C.) for 21 hrs.

(5) The dried solid (4) was crushed and screened through a 100 mesh sieve.

(6) 113.00 grams of screened solid (5) were blended with 19.94 grams of hydrogen Y zeolite (−50 mesh).

(7) The mixture was slugged and sized to 14–30 mesh.

(8) The composite catalyst was calcined at 1000° F. (538° C.) for ten hours.

The catalyst had the formula:

$$85\%(5\% W/Ni\ chrysotile) + 15\% HY\ zeolite$$

TABLE 4

| SILICA-ALUMINA MATRIX CATALYSTS CONTAINING A ZEOLITE | | | | | | | | | | | | | | | | |
|---|---|---|---|---|---|---|---|---|---|---|---|---|---|---|---|---|
| Feed: Agha Jari Heavy Gas Oil<br>Test Conditions: 1500 psig (10.3 MPa); 1.5 LHSV; 10,000 SCF H₂bbl (1780 m³H₂/m³ oil); 8 hours off-stream and 16 hours on-stream at 730° F. (388° C.); 88 hours on-stream at 750° F. (399° C.) | | | | | | | | | | | | | | | | |
| Ex. No. | 28 | | | | 29 | | | | 30 | | | | 31 | | | |
| Description | (Cat. from Ex. 24)<br>70% (11% Ni + 20% W/<br>SiO₂-Al₂O₃)+30% HY | | | | (Cat. from Ex. 25)<br>(8.6 Ni + 14% W)/<br>(70% SiO₂-Al₂ O₃+30% HY) | | | | (Cat. from Ex. 26)<br>14% W/[70% (15% Ni/SiO₂-<br>Al₂O₃ + 30% HY] | | | | (Cat. from Ex. 27)<br>14% W/[70% (15% Bi/SiO₂-<br>Al₂O₃) + 30% HY] | | | |
| Bulk Density (g/cm³) | | 0.60 | | | | 0.56 | | | | 0.59 | | | | 0.46 | | |
| Time Period | A | B | C | D | A | B | C | D | A | B | C | D | A | B | C | D |
| Conversion, Vol. % | 30 | 35 | 40 | 40 | 40 | 14 | 10 | 9 | 21 | 25 | — | — | 14 | 15 | 15 | 10 |
| MD - G | 6 | 10 | 6 | 12 | 16 | 26 | 15 | 10 | 21 | 19 | — | — | 14 | 17 | 25 | 19 |
| Nitrogen in product, ppm | 1.8 | 1.1 | <50 | 0.7 | 1.1 | 53 | 16 | 31 | 4.3 | 4.0 | — | — | 41 | 6.7 | 11 | 15 |

The Middle Distillate Minus Gasoline ("MD-G") function data for the runs shown in Table 4 above were plotted on FIG. 3. Referring to FIG. 3, it can be seen that the curve of "Percent Middle Distillate Minus Gasoline" versus "Conversion" is similar to the curve for FIG. 2, except it is displaced to the left, which indi-

EXAMPLE 33

The procedure of Example 32 was repeated except the proportions were varied in order to prepare a catalyst having the following formula:

70%(10% W/Ni chrysotile) + 30% HY zeolite,

The catalysts from Examples 32 and 33 above were employed in the runs for Examples 34 and 35. The results from Examples 34 and 35 are summarized in Table 5 below.

The Middle Distillate Minus Gasoline function for the runs shown in Examples 34 and 35 in Table 5 below were plotted in FIG. 4. Referring to FIG. 4, the curve is again similar to the curve of FIGS. 2 and 3 except displaced even farther to the left, indicating a lower activity catalyst. At conversions below about 20%, little difference is observed in selectivity. However, at higher conversions, it is evident that Ni-SMM catalysts produce greater selectivity to higher boiling products.

FIFTH SERIES OF RUNS

This series of runs illustrates the preparation of two additional catalysts outside the scope of the invention which use (a) an H-SMM matrix or (b) an alumina matrix in lieu of the nickel-SMM component of the catalysts of this invention.

EXAMPLE 36

A catalyst was prepared by impregnating 11 weight percent nickel and 20 weight percent tungsten onto an H-SMM matrix. The nickel is present by impregnation as a separate distinct phase, rather than as a substitution in the lattice, as found in the case with Ni-SMM. 30 weight percent HY zeolite was added to the admixture by dry blending as in steps (6) to (8) in Example 2.

The formula for this catalyst is:

70%[(11% Ni + 20% W)/H-SMM] + 30% HY

The H-SMM is a synthetic mica montmorillonite without any nickel substitution prepared in accordance with the teachings of Granquist in U.S. Pat. No. 3,252,757.

EXAMPLE 37

The catalyst of Example 36 was employed with the same charge stock and under the same conditions as for the other process runs described above, and the results are summarized in Table 5 below.

EXAMPLE 38

This catalyst was prepared according to the procedure in Example 36, except $Al_2O_3$ was substituted for the H-SMM matrix. Alumina is a commercially available gamma alumina. 30 weight percent HY zeolite was added to the admixture by dry blending as in steps (6) to (8) in Example 2.

The formula for this catalyst is:

70%[(11% Ni + 20% W)/$Al_2O_3$] + 30% HY

EXAMPLE 39

The catalyst from Example 38 above was employed using the same charge stock and same reaction conditions as in the other process runs described above, and the results are again summarized in Table 5 below.

TABLE 5

OTHER MATRIX CATALYSTS CONTAINING A ZEOLITE

Feed: Agha Jari Heavy Gas Oil
Test Conditions: 1500 psig (10.3 MPa)
1.5 LHSV
10,000 SCF $H_2$/bbl (1780 $m^3 H_2/m^3$ oil)
8 hours off-stream and 16 hours on-stream at 730° F. (388° C.)
88 hours on-stream at 750° F. (399° C.)

| Ex. No. | 34 | | | | 35 | | | | 37 | | | | 39 | | | |
|---|---|---|---|---|---|---|---|---|---|---|---|---|---|---|---|---|
| Description | (Cat. per Ex. 32) 85% (5% W/Ni chrysotile) + 15% HY zeolite | | | | (Cat. per Ex. 33) 70% (10% W/Ni chrysotile) + 30% HY zeolite | | | | (Cat. per Ex. 36) 70% [(11% Ni + 20% W)/ H-SMM] + 30% HY | | | | (Cat. per Ex. 38) 70% [(11% Ni + 20% W)/ $Al_2O_3$] + 30% HY | | | |
| Bulk Density (g/cm$^3$) | 0.73 | | | | 0.63 | | | | 0.74 | | | | 0.64 | | | |
| Time Period | A | B | C | D | A | B | C | D | A | B | C | D | A | B | C | D |
| Conversion, Vol. % | 27 | 18 | 19 | 15 | 11 | 12 | — | — | 3 | 8 | 9 | 8 | — | (20)$^\phi$ | (15) | (8) |
| MD-G | 11 | 20 | 16 | 22 | 19 | 12 | — | — | 18 | 14 | 15 | 15 | — | (23) | (21) | (21) |
| Nitrogen in product, ppm | 1.8 | 13 | 5.1 | 7.7 | 25 | 11 | — | — | 480 | 81 | 89 | 99 | (29) | (7.7) | (20) | (49) |

$^\phi$Figures in parentheses mean "run on a different uunit".

The Middle Distillate Minus Gasoline ("MD-G") function for the runs shown in Table 5 above were plotted on FIG. 5. Referring to FIG. 5, it can be seen that rather low conversions were obtained indicating rather low activity catalysts.

FIG. 6 is a compilation of all of the curves shown on FIGS. 1 through 5 and is included for an easy observation of the effect of different matrices on the activity and selectivity of various zeolite containing catalysts. Referring to FIG. 6, it can be observed that catalysts of this invention are the most active and most selective, even though similar amounts of tungsten and nickel and percent zeolite are present in all Examples. The graph serves the dual purpose of comparing activity and selectivity. Increasing values along the abscissa indicate greater activity. It is clear that the catalysts of this invention have produced the highest conversions of any composite catalysts which were tested. Increasing values along the ordinate are a measure of selectivity. Higher values indicate greater selectivity to higher boiling products. FIG. 6 shows that little difference is observed in selectivity of catalysts up to a conversion level of 25%. However, as conversion increases beyond this point, the Ni-SMM matrix catalysts display a clear superiority over other composite catalysts in their selectivity toward middle distillate. It is believed that the increased activity and selectivity of the composite catalysts of the invention as claimed are unexpected in view of similar zeolite-containing catalysts having matrices as described in FIGS. 3–5. Further, in yet another aspect of this invention, FIG. 6 shows most graphically that the preferred catalyst of this invention wherein the tungsten is deposited on an admixture of the Ni-SMM + zeolite components gives further increases in activity and selectivity over a catalyst containing the same components but wherein the tungsten is dispersed first through the Ni-SMM component before the zeolite is admixed therewith (the curve shown in FIG. 2).

FURTHER USE OF PREFERRED CATALYST OF THE INVENTION

The preferred catalyst of the invention (as noted from Examples 1-7 above) is tungsten uniformly dispersed throughout a mechanical admixture of the Ni-SMM and zeolite components. The data below illustrate the preparation and use of this preferred catalyst in yet a different unit using several different charge stocks.

PREPARATION OF CATALYST

EXAMPLE 40

The catalyst was prepared as described in Example 1 above except the catalyst was extruded (1/12-inch (2.1 mm) extrudates). The final catalyst had the formula:

14% W/[70%(15% Ni-SMM) + 30% HY zeolite)]

which means 14 weight percent tungsten deposited on a mechanical admixture of 70 weight percent of a nickel substituted synthetic mica-montmorillonite component containing 15% nickel plus 30 weight percent of a hydrogen Y zeolite.

The extruded catalyst from Example 40 above was placed into a fixed-bed reactor. The charge stock was passed downflow through the fixed bed of catalyst under reaction conditions to be given below and under several different sets of catalyst pretreating conditions.

The catalyst for Examples 41-43 below was placed into the fixed-bed reactor and was pretreated in accordance with the following procedure:

(1) Pretreated Agha Jari gas oil (LR 21581) spiked with 1500 ppm sulfur (as $CS_2$) and 4 ppm of fluorine (as ortho-fluorotoluene) was passed at an LHSV of 0.5 and a temperature not higher than 204° C. (400° F.) through the catalyst, together with a gas containing 91.8 mole percent hydrogen at a gas circulation rate of 1740.4 $m^3 gas/m^3$.

(2) The reaction temperature was increased step-wise at the rate of about 11° C. (22° F.) per hour until 50-55% conversion was achieved, and then at a rate of 3° to 5° C. (6° to 10° F.) until 70% single pass conversion is attained. When the unit became lined out at design conditions wherein a 70% single pass conversion was achieved, the unconverted reactor effluent was recycled to extinction and the reactor temperature adjusted to maintain the design conversion.

The results of three runs using two different pretreated Agja-Jari gas oils are summarized in Table 6 below as Examples 41-43. In each of Examples 41-43, the catalyst employed was that prepared in accordance with Example 40 above.

Referring to Table 6 below, the results show that low nitrogen content charge stocks containing either 12 ppm (Exs. 41 and 42) or 42 ppm nitrogen (Ex. 43) are suitable charge stocks for use with the catalysts of this invention. Example 42 differs from Example 41 in that the catalyst for Example 42 had 21.7 days of aging compared with 17.7 days of aging for the catalyst in Example 41. It will be noted that the aging rate was a very acceptable 1.25° C. (2.25° F.) per day.

The same catalyst made in accordance with Example 40 above and pretreated as described for Examples 41-43 above was employed in the same reactor except using a furnace oil charge stock designated LR 21321 in Table 1 above. The results of this run are shown in Table 6 below as Example 44.

Finally, the catalyst of Example 40 above was employed using the same furnace oil charge stock as in Example 44, except the catalyst was pretreated under the same conditions as were used in the earlier Examples 1-39 above. The results of these runs are also tabulated in Table 6 as Examples 45 and 46.

TABLE 6

FURTHER USE OF PREFERRED CATALYST
Catalyst: In all Examples, the catalyst formula was: 14% W/[70% (15% Ni-SMM) + 30% HY zeolite] and the catalyst was repared as per Ex. 40

| Example No. | 41 | | 42 | | 43 | | 44 | | 45 | | 46 | |
|---|---|---|---|---|---|---|---|---|---|---|---|---|
| Charge Stock Employed (See Table 1 for Description) | LR 21581 | | LR 21581 | | LR 21506 | | LR 21321 | | 21321 | | LR 21321 | |
| Operating Conditions: | | | | | | | | | | | | |
| Reaction Pressure, kPa | 13661 | | 13661 | | 13661 | | 10407 | | 10407 | | 10407 | |
| Reaction Gas Circulation Rate: | | | | | | | | | | | | |
| $m^3/m^3$ Total Feed | 1740.4 | | 1740.4 | | 1740.4 | | 1788 | | 1788 | | 1788 | |
| $H_2$ Composition, mol % | 91.8 | | 91.8 | | 91.8 | | 75 | | 95 | | 95 | |
| Space Velocity, Total Feed | | | | | | | | | | | | |
| LHSV | 1.01 | | 1.01 | | 1.01 | | 1.02 | | 1.51 | | 1.51 | |
| WHSV | 1.11 | | 1.11 | | 1.12 | | 1.09 | | 1.64 | | 1.62 | |
| Conversion Per Pass, % | 69.7 71.2 | | 70.6 67.1 | | 70.6 | | 69.5 | | | | | |
| Reaction Temperature, ° C. | 323 | | 328 | | 341 | | 301 | | 308 | | 358 | |
| Hydrogen Consumption | | | | | | | | | | | | |
| Unit, $m^3/m^3$ FF | 223.9 | | 221.3 | | 290.3 | | 199.8 | | 237.0 | | 260.1 | |
| Chemical, $m^3/m^3$ FF | 222.9 | | 219.2 | | 254.9 | | 183.8 | | 182.2 | | 305.4 | |
| Yields, Vol %, Wt % | Vol % | Wt % | Vol % | Wt % | Vol % | Wt % | Vol % | Wt % | Vol % | Wt % | Vol % | Wt % |
| Debutanized Naphtha | 111.3 | 91.7 | 112.9 | 92.7 | 114.5 | 91.3 | 106.5 | 92.8 | 106.0 | 91.2 | 107.8 | 92.4 |
| I-Butane | 9.4 | 6.1 | 8.4 | 5.5 | 9.1 | 5.9 | 8.2 | 5.6 | 10.0 | 6.8 | 8.6 | 5.9 |
| n-Butane | 3.4 | 2.3 | 3.2 | 2.1 | 3.8 | 2.5 | 2.8 | 2.0 | 3.4 | 2.4 | 3.4 | 2.4 |
| Propane | 2.8 | 1.7 | 2.5 | 1.5 | 3.1 | 1.8 | 2.3 | 1.4 | 2.4 | 1.4 | 2.8 | 1.7 |
| $C_1 + C_2$ | | 0.1 | | 0.1 | | 0.1 | | 0.1 | | 0.4 | | 0.1 |
| $H_2S$ | | 0.3 | | 0.2 | | 0.2 | | 0.1 | | 0.1 | | 0.1 |
| $H_2$ | | −2.1 | | −2.1 | | −2.7 | | −2.0 | | −2.3 | | −2.6 |
| Total | 126.9 | 100.0 | 127.0 | 100.0 | 130.5 | 100.0 | 119.8 | 100.0 | 121.8 | 100.0 | 122.6 | 100.0 |
| I-$C_4$/n-$C_4$ | 2.8 | | 2.6 | | 2.4 | | 2.9 | | 2.9 | | 2.5 | |
| vol % Naphtha minus vol % $C_3$ + $C_4$ | 95.7 | | 98.8 | | 98.5 | | 93.2 | | 90.2 | | 93.0 | |

Referring to Table 6, Example 46 differs from Example 45 in that 300 ppm of ammonia were added to the charge stock to simulate a high nitrogen content furnace oil. The loss in activity of the catalyst due to the presence of the additional nitrogen in Example 46 was 50° C. (90° F.) when compared to the nitrogen-free system (Ex. 45).

Resort may be had to such variations and modifications as fall within the spirit of the invention and scope of the appended claims.

We claim:

1. A catalyst composite consisting essentially of:
   (A) from 3 to 25 weight percent of tungsten in the form of metal oxide or metal sulfide, or any mixture thereof, calculated as the metal;
   (B) from 35 to 80 weight percent of a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

$$[(Al^{3+}{}_{4-ew}Y^{2+}{}_{3w})^{VI}(Q^{4+}{}_{8-x}Al^{3+}{}_x)^{IV} O_{20}(OH)_{4-f}F_f]\cdot[dC^y]$$

where Al is aluminum;
   Y is selected from the class consisting of nickel, cobalt and mixtures thereof;
   Q is at least 0.95 mol fraction silicon ions, the remainder consisting of tetravalent ions having an ionic radius not to exceed 0.65 Å; and
   F is fluorine;
   C is at least one charge-balancing cation; and where e has a numerical value from 2 to 3 inclusive;
   w has a numerical value from 0.01 to 2 inclusive, with the proviso that the quantity ew have a numerical value from 0.02 to 4 inclusive;
   f has a value of 4 or less;
   x has a numerical value from 0.05 to 2.0 inclusive;
   y is the valence of the cation C;
   d is the number of cations C where the product $$dy = x + 3(e-2)w$$

and wherein said first bracket represents said layer-lattice unit cell formulation and said second bracket represents said charge-balancing cations; and
   (C) from 5 to 50 weight percent of a crystalline zeolite having an alpha value of at least 20;
   and wherein said composite is formed by:
      (i) initially coating or impregnating component (B) with component (A); and
      (ii) thereafter uniformly dispersing component (C) through the mixture of components (A) and (B) formed in step (i).

2. A composition according to claim 1 werein Y in said laminar 2:1 lattic-layer aluminosilicate mineral is nickel and Q is silicon.

3. A composition according to claim 2 wherein said zeolite is selected from the group consisting of X and Y zeolites or mixtures thereof.

4. A composition in accordance with claim 2 wherein said second bracket in said laminar 2:1 layer-lattic aluminosilicate formula has the composition:

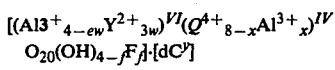

wherein $$an + bz = dy = x + 3(e-2)w$$

and M is selected from the group consisting of hydrogen, ammonium, multivalent metal cations other than aluminum, and partial hydroxides of multivalent metal cations, and n is the unsatisfied valence of M.

5. A composition according to claim 4 wherein the amount of nickel in said mineral is from 0.1 to 35 weight percent of said mineral.

6. A composition according to claim 4 wherein said amount of tungsten is from 6 to 20 weight percent of the composite catalyst; said zeolite is from 10 to 35 weight percent of the composite catalyst; and said laminar 2:1 layer-lattice aluminosilicate mineral is from 40 to 70 weight percent of the composite catalyst.

7. A catalyst composition according to claim 1 wherein said tungsten component A is uniformly dispersed through said component B from an aqueous solution of a salt of tungsten which is capable of conversion to the oxide form and which salt is thereafter converted to said oxide form.

8. A composition according to claim 7 wherein Y in said laminar 2:1 layer-lattice aluminosilicate mineral is nickel and Q is silicon.

9. A composition according to claim 8 wherein said zeolite is selected from the group consisting of X and Y zeolites or mixtures thereof.

10. A composition according to claim 9 wherein said zeolite is in the hydrogen form.

11. A composition according to claim 9 wherein said zeolite has a hydrogenation metal at least partially replacing hydrogen ions.

12. A composition according to claim 11 wherein the hydrogenation metal is nickel.

13. A catalyst composite consisting essentially of:
   (A) from 3 to 25 weight percent of tungsten in the form of metal oxide or metal sulfide, or any mixture thereof, calculated as the metal;
   (B) from 35 to 80 weight percent of a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

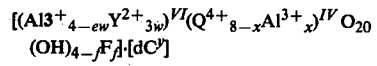

where Al is aluminum;
   Y is selected from the class consisting of nickel, cobalt and mixtures thereof;
   Q is at least 0.95 mol fraction silicon ions, the remainder consisting of tetravalent ions having an ionic radius not to exceed 0.65 Å; and
   F is fluorine;
   C is at least one charge-balancing cation; and where e has a numerical value from 2 to 3 inclusive;
   w has a numerical value from 0.01 to 2 inclusive, with the proviso that the quantity ew have a numerical value from 0.02 to 4 inclusive;
   f has a value of 4 or less;
   x has a numerical value from 0.05 to 2.0 inclusive;
   y is the valence of the cation C;
   d is the number of cations C where the product $$dy = x + 3(e-2)w$$

and wherein said first bracket represents said layer-lattice unit cell formulation and said second bracket represents said charge-balancing cations; and
(C) from 5 to 50 weight percent of a crystalline zeolite having an alpha value of at least 20;
and wherein said composite is formed by:
(i) initially admixing component (B) and component (C); and
(ii) thereafter coating or impregnating the admixture formed in step (1) of components (B) and (C) with component (A).

14. A composition according to claim 3 wherein Y in said laminar 2:1 layer-lattice aluminosilicate mineral is nickel, Q is silicon, and the second bracket in said laminar 2:1 layer-lattice aluminosilicate mineral formula has the composition:

wherein $$an + bz = dy = x + 3(e-2)w$$

and M is selected from the group consisting of hydrogen, ammonium, multivalent metal cations other than aluminum, and partial hydroxides or multivalent metal cations, and n is the unsatisfied valence of M.

15. A composition according to claim 14 wherein said zeolite is selected from the group consisting of X and Y zeolites or mixtures thereof.

16. A composition according to claim 15 wherein the amount of nickel in said mineral is from 0.1 to 35 weight percent of said mineral; the laminar 2:1 layer-lattice aluminosilicate mineral is from 40 to 70 weight percent of the catalyst composite; the amount of tungsten is from 6 to 20 weight percent of the catalyst composite; and the zeolite component is from 10 to 35 weight percent of the catalyst composite.

17. A catalyst composition according to claim 13 wherein said tungsten component A is uniformly dispersed through said admixture of components B and C from an aqueous solution of a salt of tungsten which is capable of conversion to the oxide form and which salt is thereafter converted to said oxide form.

18. A composition according to claim 17 wherein Y in said laminar 2:1 layer-lattice aluminosilicate mineral is nickel, and Q is silica.

19. A composition according to claim 18 wherein said zeolite is selected from the group consisting of X and Y zeolites or mixtures thereof.

20. A composition according to claim 19 wherein said zeolite is in a hydrogen form.

21. A composition according to claim 19 wherein said zeolite has a hydrogenation metal at least partially replacing hydrogen ions.

22. A composition according to claim 21 wherein the hydrogenation metal is nickel.

23. A hydrotreating process which comprises contacting a hydrocarbon feed containing substantial amounts of materials boiling above 200° F. and selected from the group consisting of petroleum distillates, solvent deasphalted petroleum residua, shale oils and coal derived liquids or coal tar distillates in a reaction zone with hydrogen at hydrotreating conditions to obtain the conversion of at least 25 volume percent of said hydrocarbon feed with the catalyst of claim 1.

24. A process according to claim 23 wherein said hydrotreating conditions include a temperature in the range of 400° to 950° F., a pressure in the range of 800 to 3500 psig, and a liquid hourly space velocity in the range of 0.25 to 5.0 volumes of charge stock per volume of catalyst per hour, and a total hydrogen supply rate of 800 to 20,000 SCF of hydrogen per barrel of feedstock and recovering hydrotreated products from said reaction zone.

25. A process according to claim 24 wherein Y in said laminar 2:1 layer-lattice aluminosilicate mineral is nickel and Q is silicon.

26. A process according to claim 25 wherein said zeolite is a Y-zeolite.

27. A process according to claim 26 wherein said Y-zeolite is in the hydrogen form.

28. A process according to claim 26 wherein said Y-zeolite has a hydrogenation metal at least partially replacing the hydrogen ions.

29. A process according to claim 28 wherein said hydrogenation metal is nickel.

30. A process in accordance with claim 29 wherein said second bracket in said laminar 2:1 layer-lattice aluminosilicate mineral formula has the composition:

wherein $$an + bz = dy = x + 3(e-2)w$$

and M is selected from the group consisting of hydrogen, ammonium, multivalent metal cations other than aluminum, and partial hydroxides of multivalent metal cations, and n is the unsatisfied valence of M.

31. A process in accordance with claim 30 wherein said charge stock is a petroleum charge stock boiling from 400° to 1100° F. at atmospheric pressure.

32. A hydrotreating process which comprises contacting a hydrocarbon feed containing substantial amounts of materials boiling above 200° F. and selected from the group consisting of petroleum distillates, solvent-deasphalted petroleum residua, shale oils and coal derived liquids or coal tar distillates in a reaction zone with hydrogen at hydrotreating conditions to obtain the conversion of at least 25 volume percent of said hydrocarbon feed with the catalyst of claim 13.

33. A process according to claim 32 wherein said hydrotreating conditions include a temperature in the range of 400° to 950° F., a pressure in the range of 800 to 3500 psig, and a liquid hourly space velocity in the range of 0.25 to 5.0 volumes of charge stock per volume of catalyst per hour, and a total hydrogen supply rate of 800 to 20,000 SCF of hydrogen per barrel of feedstock and recovering hydrotreated products from said reaction zone.

34. A process according to claim 33 wherein the conversion is from 50% to 75% of said hydrocarbon feed.

35. A process according to claim 33 wherein the hydrocarbon feed has a nitrogen content ranging from 350 to 4000 ppm.

36. A process according to claim 35 wherein the hydrocarbon feed has from 700 to 1800 ppm of nitrogen and a product is recovered having less than 10 ppm of nitrogen.

37. A process according to claim 33 wherein Y in said laminar 2:1 layer-lattice aluminosilicate mineral is nickel and Q is silicon.

38. A process according to claim 37 wherein said zeolite is a Y-zeolite.

39. A process according to claim 38 wherein said Y-zeolite is in the hydrogen form.

40. A process according to claim 38 wherein said Y-zeolite has a hydrogenation metal at least partially replacing the hydrogen ions.

41. A process according to claim 40 wherein said hydrogenation metal is nickel.

42. A process in accordance with claim 41 wherein said second bracket in said laminar 2:1 layer-lattice aluminosilicate mineral formula has the composition:

$$a\ M^n + b\ Al(OH)^z{}_{3-z}$$

wherein $$an + bz = dy = x + 3(e-2)w$$

and M is selected from the group consisting of hydrogen, ammonium, multivalent metal cations other than aluminum, and partial hydroxides of multivalent metal cations, and n is the unsatisfied valence of M.

43. A process in accordance with claim 42 wherein said charge stock is a petroleum charge stock boiling from 400° to 1100° F. at atmospheric pressure.

* * * * *

UNITED STATES PATENT OFFICE
CERTIFICATE OF CORRECTION

Patent No. 4,138,326  Dated February 6, 1979

Inventor(s) Harold E. Swift and Roger F. Vogel

It is certified that error appears in the above-identified patent and that said Letters Patent are hereby corrected as shown below:

Col. 1, line 57, insert --possessing-- before "layer-lattice";

Col. 1, line 62, that part of the formula which reads "$(Q^{4+}_{8-x}Al_{3+x})$" should read: --$(Q^{4+}_{8-x}Al^{3+}_{x})$--;

Col. 4, line 60, that part of the formula which reads "$(OH)_{z3-z}$" should read: --$(OH)^{z}_{3-z}$--;

Col. 16, Table 3, Ex.No.17 under "A", 3rd number down, "33" should be --22--;
Col. 23, Table 6, Ex. 45 under "1.64" insert --71.2--;
Col. 23, Table 6, Ex. 46 under "1.62" insert --67.1--;
Col. 23, Table 6, under Ex.No. "41", 8th item down, delete "67.1";
Col. 23, Table 6, under "Example No.", 13th line down, delete "71.2";
Col. 25, line 56, "lattic-layer" should be --layer-lattice--;
Col. 27, line 17, that part of the formula which reads "$(OH)_{3-z}z)$" should read: --$(OH)^{z}_{3-z}$--.

Signed and Sealed this

Tenth Day of July 1979

[SEAL]

Attest:

LUTRELLE F. PARKER

Attesting Officer     Acting Commissioner of Patents and Trademarks